Feb. 9, 1954
C. G. NELSON
2,668,868
FLAT DRY CELL BATTERY PACK
Filed Sept. 5, 1951
2 Sheets-Sheet 1
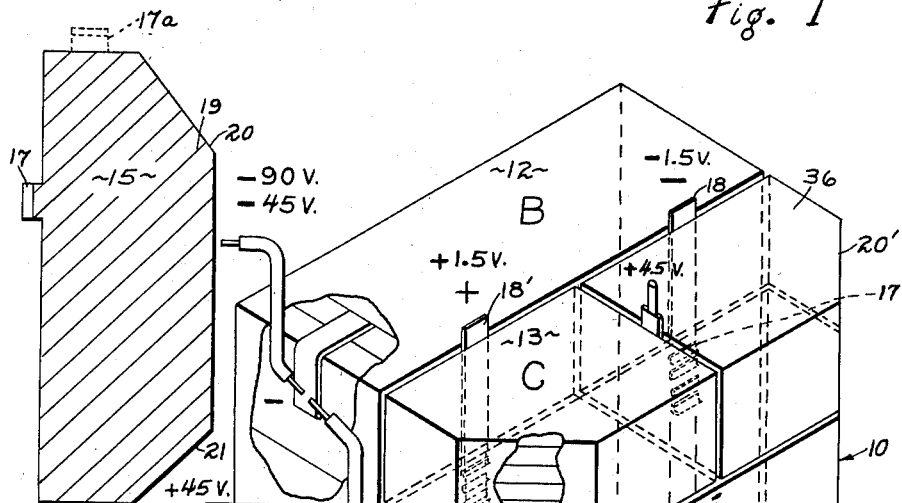
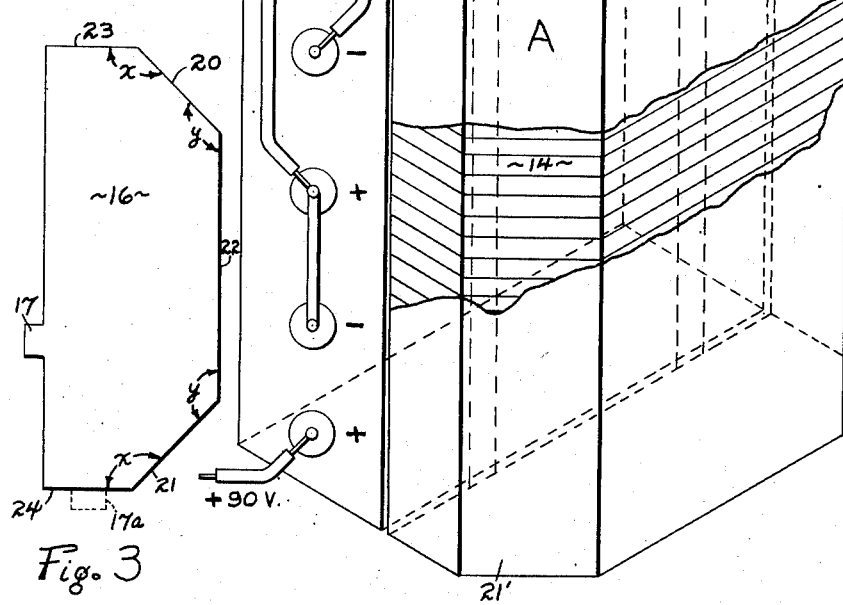
CLIFFORD G. NELSON
INVENTOR.
BY Beale and Jones
Attorneys Feb. 9, 1954 C. G. NELSON 2,668,868
FLAT DRY CELL BATTERY PACK
Filed Sept. 5, 1951 2 Sheets-Sheet 2
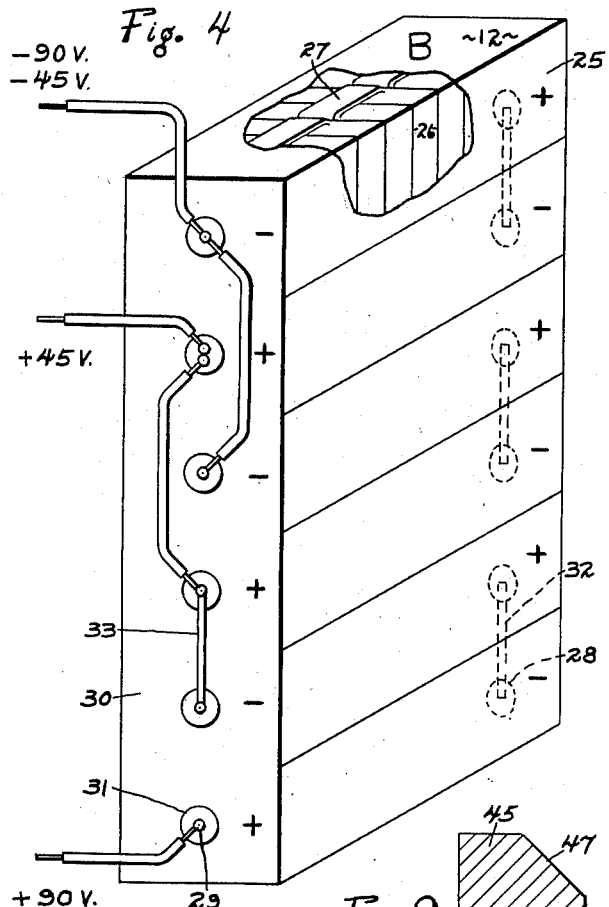
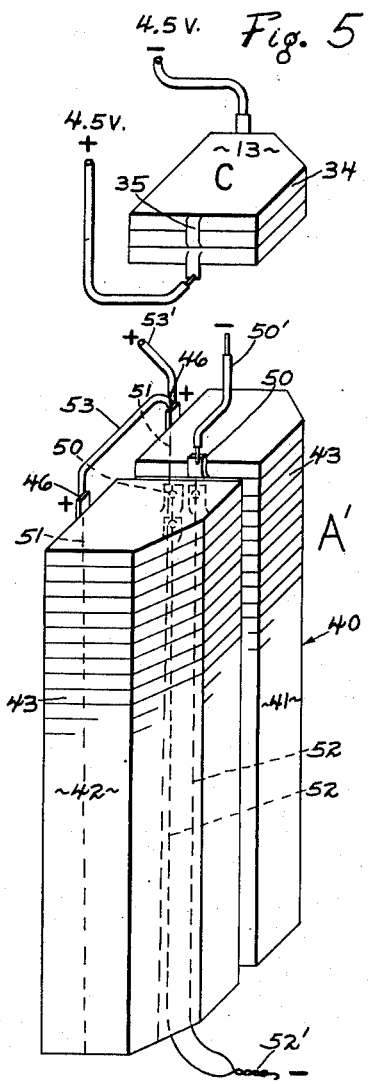
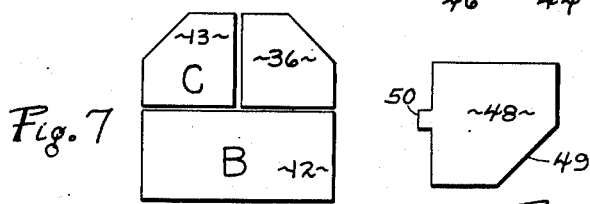
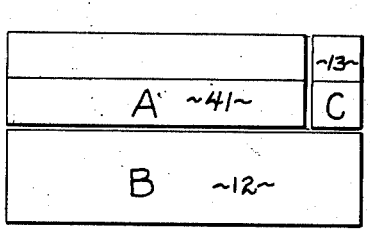
CLIFFORD G. NELSON
INVENTOR.
BY *Beale and Jones*
Attorneys Patented Feb. 9, 1954

2,668,868

UNITED STATES PATENT OFFICE 2,668,868

FLAT DRY CELL BATTERY PACK

Clifford G. Nelson, Stoughton, Wis., assignor to Ray-O-Vac Company, Madison, Wis., a corporation of Wisconsin Application September 5, 1951, Serial No. 245,165

6 Claims. (Cl. 136—111)

This invention relates to improvements in battery packs of A, B and C batteries of the flat dry cell type.

Dry cell battery packs heretofore have been made using a number of small cells connected in series or series-parallel to form the B battery and with an A battery made up of a number of cells connected in parallel or series-parallel.

The A battery has been made up of cells having cylindrical carbon cathodes as the general rule.

In my copending application Serial No. 245,166 filed September 5, 1951, concurrently with this application there are disclosed A and B batteries made up of elements that are common to each of the batteries. These batteries are of the flat type with the cells of the B battery connected in series or series-parallel with the A battery connected in parallel or series-parallel. The A batteries are of the flat type using a flat anode and a cathode in each of the cells.

It is an object of this invention to provide a dry cell battery pack using flat cells of the A, B and/or C type as disclosed in my concurrently filed copending application.

Another object of my invention is to provide a battery pack of A, B and C batteries of such capacity that all cells will have approximately the same effective life under the drain to which they are subjected so that the entire battery pack will become substantially exhausted at substantially the same time.

A further object of this invention is to improve the efficiency and construction of such battery packs.

A still further object of my invention is to provide a battery pack that is assembled with A, B and C batteries that are compact and have a maximum capacity in relation to the space occupied.

A further object of my invention is to provide a dry cell battery pack whose outer contours lend themselves to be fitted into spaces of any required size, shape or degree of irregularity.

Further objects and advantages of the invention will be apparent from the following detailed description; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the nature and scope of my invention reference can be had to the following detailed description taken in connection with the accompanying drawing in which:

Fig. 1 is a perspective view of an A, B and C battery pack with portions of the casing broken away disclosing the stacked up flat battery cells of each battery;

Fig. 2 is a plan view of a cathode electrode as used in making the cells in the A battery utilized in the pack of Fig. 1;

Fig. 3 is a plan view of an anode electrode of like shape to the cathode of Fig. 2 and also used in the cells of the A battery in the pack of Fig. 1;

Fig. 4 is a perspective view of a B battery showing six stacks of cells making up the battery, their end terminal connections, and a broken away portion on one stack of cells showing the integral jumpers connecting one cell to another cell along the outside thereof;

Fig. 5 is a C battery as utilized in making up the battery packs;

Fig. 6 is a perspective view of another form of A battery having two stacks of cells each stack of which is connected in parallel;

Fig. 7 is a diagrammatic end view of a battery pack showing A, B and C batteries;

Fig. 8 is a left-hand side view of the battery pack shown in Fig. 7;

Fig. 9 is a plan view of a cathode electrode as utilized in making up the cells of the A battery shown in Fig. 6; and Fig. 10 is a plan view similar to Fig. 9 of an anode electrode.

Throughout the figures of the drawings and the description like reference numerals refer to similar elements.

In Fig. 1 there is shown a battery pack 10 according to my invention in which an A battery is indicated by 11 and also by "A," a B battery by 12 and also by "B" and a C battery by 13 and also by "C." Each of the batteries is made of flat stacked cells according to the disclosure, in Figures 10, 11, 18 and 19 in my copending application concurrently filed with this application. There may be provided an outer casing conforming to the shape of the outer contour of the assembled batteries.

The A battery 11 is made up of flat cells 14 having flat elements sealed within a sheath of flexible electrolyte-resisting dielectric material such as Pliofilm or like material. In the case of the A battery 11 shown in Fig. 1 the electrodes used in the cells are of generally complementary shape as depicted for the cathode 15, see Fig. 2, and the anode 16, see Fig. 3. Each of the anodes and cathodes has a projecting tab 17 integrally connected therewith and projecting from one edge which serves as a terminal for connecting a common connector 18, see Fig. 1. The tab may be integral with an end of the electrodes as shown alternatively at 17a in Figures 2 and 3. In such a case the common connector 18 would extend up at each end of the A battery. Each of the electrodes 15 and 16 may be of metal, such as zinc, and the cathode formed in Fig. 2 may be coated with electrolyte resistant, electrically conductive material as indicated by 19. The cells are individually wrapped within a sheath of Pliofilm or the like material as explained more fully in my copending concurrently filed application, such as shown in Figures 10 and 12 and the description on pages 8-10 of my copending application. It will be noted in Figures 1 and 2 that each electrode has diagonal corners 20 and 21 wherein the diagonal 20 forms an angle at $x$ and $y$ of greater than 90° with the adjacent edges 22 and 23 to the diagonal edge 20. In the case of the diagonal 21 the adjacent edges are 22 and 23 as shown also in Fig. 3. It will be observed that the A battery 11 made up the cells 14 having electrodes of the shape shown in Figures 2 and 3 provides diagonal portions or faces 20' and 21' at the outer corners of the battery pack shown in Fig. 1. These diagonal faces form a surface which conforms to irregular shapes to produce maximum capacity for minimum volume.

Referring to Fig. 1, there is shown common connectors 18 and 18' for the respective vertical rows of tabs 17 by which the batteries are connected in parallel.

In Fig. 4 there is illustrated the B battery 12 which is made up of six rows of cells indicated at 25. Each row has 15 cells which are connected in series by the jumper or connector members 27 incased within a common sheath as explained in my copending concurrently filed application, such as shown in Figures 10 and 12 and the description on pages 8-10 of my copending application. Each cell of the LeClanche type is 1.5 volts, thus making up 22½ volts for each stack 25. Each stack 25 has a negative terminal 28 and a positive terminal 29. The battery 12 has a casing 30 having apertures 31 through which the terminals project. Suitable jumpers 32 connect the rear ends of the stacks of cells in series. Other connectors on the front ends of the stacks of cells are indicated generally at 33. The battery 12 here shown in Fig. 4 and as also shown in the pack in Fig. 1 provides for 45 volt and 90 volt leads.

Referring to Fig. 5 there is shown a C battery which is of like construction to the series connected individual cells of the B battery but having a lesser number of cells. There is here shown three LeClanche type cells 34 of 1.5 volts each, thus making up a C battery of 4.5 volts. This C battery is made using duplex electrodes as explained for the construction of B batteries in my copending concurrently filed application in which there is a connector leading from an anode of one cell to the cathode of the adjacent cell. The cells and connectors may be encased within a sheath of Pliofilm or the like which may be made of a sheet placed on one side of the cell with another sheet placed on the other side of the cell and the two sheets sealed together around the cell and the connecting jumper. The encased jumpers or connectors are shown at 35 in Fig. 5.

Each anode and cathode in Fig. 5 is of a generally square shape having a diagonal corner edge as generally shown in Figures 9 and 10 where A battery electrodes are depicted. This shape provides for maximum capacity and yet, complementary shape with respect to the adjacent portion of the A battery 11 shown in Fig. 1. The C battery 13 of Fig. 5 is shown assembled in the pack in Fig. 1 as resting on one end of the A battery 11. This C battery 13 in Fig. 1 has half the planar area of the A battery 11 on which it rests and thus the space 36 adjacent C battery 13 may be used for any desired purposes; such as additional cell units, a space to accommodate necessary wiring or to seat a conventional socket to which the respective terminal leads of the batteries are connected. It will be noted in Fig. 1, that the connectors 18 and 18' for the A battery extend up along the inside surface of the C battery 13, however, in case electrodes with alternative tabs 17a are used as shown in Figures 2 and 3, the connectors 18 and 18' would extend up along each end.

In Figure 6 is a modified form of A battery designated generally 40 and also A'. It consists of two stacks 41 and 42 of flat cells 43 which are connected in parallel as will be presently described.

In Fig. 9 is shown a plan view of a flat electrode of metal 44 which is coated with carbon 45, thus forming a cathode. This electrode 45 may be stamped out of metal, such as zinc, and has an integral projecting connector tab or terminal 46. There is a diagonal corner edge 47 for maximum capacity purposes for the space provided as in the made up battery explained above which uses the electrodes shown in Figures 2 and 3. In Figure 10 is shown an anode 48 which may be of similar shape to the cathode 47 and it also is provided with a diagonal corner edge 49 and an integral terminal tab 50.

Referring again to Fig. 6 each stack 41 and 42 of flat A battery cells is shown with projecting tabs 46 connected together by common vertical connectors 51—51. The tabs 50 are likewise connected together by common connectors 52—52 shown in broken line. Connectors 52 are connected together as at 52'. A further common connector 53 serves to connect the two vertical connector strips 51—51. A suitable lead 53' connects with connector 53 while a lead 50' connects with connector 50.

In Figures 7 and 8 there is shown how the A, B and C batteries are stacked together to form a battery pack. Fig. 7 is an end view showing the B battery 12 having associated therewith the C battery 13 and a connector or socket space 36. Fig. 8 is a left-hand side view of the pack in Fig. 7, showing the A batteries 41 and 42 with the C battery 13 adjacent one end of A battery stack 41.

The battery packs according to my invention may be made up in various sizes and shapes of which some of the possible shapes are herein illustrated, other shapes will be apparent from applicant's copending application filed concurrently herewith such as depicted in Figures 20-28 and described on pages 15-20 of that copending application. The flat cells for the A, B and C batteries in which a common shape, such as that of the A and C batteries, lend themselves to be made up into various sizes of stacks having capacities as desired. By using flat cells for all batteries, the capacities of the different batteries can be so proportioned for a given radio or electronic device that the various batteries have a coextensive life.

It has been found that great flexibility is obtained in making up battery packs in which all cells including the A battery cells are of the flat type as here depicted.

It has also been found that the diagonal edges in the battery pack aid in making a more compact pack that may be easily fitted to any desired shape with maximum capacity.

It should be understood that the cell units employed in the fabrication of the battery pack herein described may be connected in series, or parallel or series-parallel as desired and may be formed in any desired size or shape or for any desired capacity in accordance with the teaching in my copending application Serial No. 245,166, filed September 5, 1951, entitled "Flat Dry Battery," concurrently executed and filed herewith. It should also be understood that the nature, characteristics and shape of the electrodes, depolarizer mix cake, electrical connections or jumpers, and plastic covering may all be employed as defined and described in such copending application.

I claim as my invention:

1. In a dry cell battery pack; an outer casing having electrical outlets; a plurality of battery units within said casing having terminals electrically connected to said outlets; said units being insulated each from the other, one of said units comprising an A battery unit and another of said units comprising a B battery unit, said A battery unit comprising a plurality of flat dry cells arranged in stacked relation and connected in parallel or series-parallel, each cell comprising a flat metallic mono-lobe having a projecting tab forming an anode, a second mono-lobe of flat electrically conductive material forming a cathode having a projecting tab, an electrolyte-carrier in contact with said anode, a flat depolarizing mix cake between said electrolyte-carrier and said cathode, a sheath of plastic dielectric insulating material enclosing each of said cells while permitting said tabs to project from said sheath, a common electrical connector for said anode tabs, a common electrical connector for said cathode tabs, and binding means about said cells holding them in stacked relationship; said B battery unit comprising a plurality of flat cells, each cell including an electrolyte cell element with an anode and a cathode and an integral electrical connector connecting an anode of one cell to a cathode of an adjacent cell, arranged in a common sheath of flexible electrolyte-resisting dielectric material, said sheath being applied to said plurality of cells to form separate compartments within which said cells are individually enclosed, whereby said sheath prevents the escape of electrolyte from one cell to another while electrical contact between cells is obtained through said electrical connectors, said B battery cells being stacked with their flat surfaces adjacent each other by folding the sheath between adjacent cells to produce a zig-zag form and having binding means surrounding the stacked cells to hold them in desired proximity.

2. A dry cell battery pack of the character described in claim 1 wherein said flat elements making up the cells of the A battery are of generally symmetrical shape having at least one outer corner defined by diagonal edges which are disposed at angles of greater than 90° with respect to the edges adjacent said diagonal corner.

3. In a dry cell battery pack; a plurality of battery units including A, B and C battery units; said A battery unit comprising two stacks of flat dry cells, each of the cells comprising a stack being connected in parallel or series-parallel and each stack being connected in parallel or series-parallel, said flat dry cells making up the A battery comprising a flat metallic mono-lobe having a projecting tab forming an anode, a second mono-lobe of flat electrically conductive material having a projecting tab forming a cathode, an electrolyte-carrier in contact with said anode, a flat depolarizer mix cake between said electrolyte and said cathode, a sheath of plastic dielectric insulating material enclosing each of said cells while permitting said tabs to project from said sheath, a common electrical connector for said anode tabs, a common electrical connector for said cathode tabs, and binding means about said cells holding them in stacked relationship; said B battery unit comprising a plurality of flat cells, each cell including an electrolyte cell element with an anode and a cathode and an integral electrical connector connecting an anode of one cell to a cathode and adjacent cell, arranged in a common sheath of flexible electrolyte-resisting dielectric material, said sheath being applied to said plurality of cells to form separate compartments within which said cells are individually enclosed, whereby said sheath prevents the escape of electrolyte from one cell to another while electrical contact between cells is obtained through said electrical connectors, said B battery cells being stacked with their flat surfaces adjacent each other by folding the sheath between adjacent cells to produce a zig-zag form and having binding means surrounding the stacked cells to hold them in desired proximity; said C battery being constructed like said B battery and being so shaped as to be adapted to be assembled in said pack adjacent an end of one of said stacks of cells, comprising said A battery.

4. A dry cell battery pack of the character described in claim 3 wherein said flat elements making up the cells of the A and C batteries are of general rectangular shape having a corner thereof defined by a diagonal edge which is disposed at an angle of greater than 90° with respect to the edges adjacent said diagonal edge, said A battery cells being stacked up so that said diagonal edges are at the outer corners of said two stacks of A battery cells, said C battery being disposed in flat adjoining relation on an end of one of the stacks of cells making up the A battery with the said diagonal edge thereof in alignment with the adjacent diagonal edge on said stack of A cells.

5. In a dry cell battery pack; a plurality of units including A and B battery units; said units being insulated from each other and having terminals thereon; said A battery unit comprising a plurality of flat dry cells arranged in stacked relation and connected in parallel or series-parallel, each cell comprising a flat metallic mono-lobe having a projecting tab forming an anode, a flat mono-lobe of metal coated with an electrolyte-resistant electrically conductive material forming a cathode having a projecting tab, an electrolyte-carrier in contact with said anode, a flat depolarizer mix cake between said electrolyte-carrier and said cathode, a sheath of flexible electrolyte-resistant dielectric plastic material enclosing each of said cells whereby an air space is provided at least adjacent one edge of electrode mono-lobes and said tabs project from said sheath, a common electrical connector for said anode tabs, a common electrical connector for said cathode tabs, and means holding said cells in stacked relationship; said B battery comprising a first elongated strip of flexible electrolyte-resistant dielectric material having an adhesive coating on one face along at least the elongated center portion thereof, a first set of duplex electrodes of duo-lobe shape positioned in spaced relationship from each other along said adhesive coated first strip, said duplex electrodes comprising an anode and a cathode of complementary shape connected together by a jumper and oriented so that an anode of one duplex electrode is spaced next adjacent a cathode of another duplex electrode and of such width that marginal elongated edge areas are provided on said first elongated strip, an electrolyte-carrier element overlying each anode of said first set of duplex electrodes, a flat depolarizer mix cake overlying each cathode of the first set of duplex electrodes and each electrolyte-carrier element on said first set of anodes, an electrolyte-carrier element overlying each mix cake on said first set of cathodes, a second set of integral duplex electrodes complementary with said first set and positioned so that the anodes thereof overlie said mix cakes on said first set of electrolyte-carrier elements, and a second elongated strip of flexible electrolyte-resistant dielectric plastic material having an adhesive coating on one face thereof along at least the elongated center portion thereof with the adhesive face overlying said second set of duplex electrodes and having marginal elongated edge areas oppositely positioned to the marginal edge areas of said first strip, said opposite marginal edge areas and the spaces on said strips between said electrodes being secured together thereby forming a common sheath and separate compartments within which said respectively associated anodes, electrolyte carrier elements, mix cakes and cathodes are formed as cells individually enclosed and said integral jumpers on each duplex electrode connects said cells in series or series-parallel, said common sheath with its enclosed cells being folded in a zig-zag manner to provide a stack of such individually enclosed cells, and means holding said cells in stacked position.

6. A dry cell battery pack according to claim 5 wherein the cell units are enclosed by two strips of plastic dielectric sheathing integrally connected along a common foldable edge.

CLIFFORD G. NELSON.

No references cited.